US005875878A

United States Patent [19]

Pierson

[11] Patent Number: 5,875,878

[45] Date of Patent: Mar. 2, 1999

[54] ROLLER SHAFT MOUNTING FOR SOUND AND MOTION CONTROL

[75] Inventor: Bruce A. Pierson, Cincinnati, Ohio

[73] Assignee: HK Systems, Inc., New Berlin, Wis.

[21] Appl. No.: 865,545

[22] Filed: May 29, 1997

Related U.S. Application Data

[62] Division of Ser. No. 375,931, Jan. 20, 1995, Pat. No. 5,678,676.

[51] Int. Cl.[6] ...................... B65G 13/00

[52] U.S. Cl. ...................... 193/37; 193/35 B

[58] Field of Search ...................... 198/780; 193/35 R, 193/35 B, 37

[56] References Cited

U.S. PATENT DOCUMENTS

| | | | |
|---|---|---|---|
| 833,326 | 10/1906 | Hiler . | |
| 1,406,228 | 2/1922 | Riedel . | |
| 2,152,076 | 3/1939 | Menough | 198/780 X |
| 2,396,079 | 3/1946 | Bowen | 193/35 |
| 2,696,283 | 12/1954 | Barry | 193/35 |
| 2,860,766 | 11/1958 | Welter | 198/127 |
| 3,215,253 | 11/1965 | Grantham | 198/127 |
| 3,502,197 | 3/1970 | Kato et al. | 198/127 |
| 3,540,561 | 11/1970 | Becker | 193/35 |
| 3,599,769 | 8/1971 | Gardella | 193/35 |
| 3,724,642 | 4/1973 | De Good | 198/127 R |
| 3,751,122 | 8/1973 | Dubay | 308/63 |
| 4,056,180 | 11/1977 | Gunti | 193/35 J |
| 4,148,386 | 4/1979 | Bradbury | 193/37 |
| 4,193,493 | 3/1980 | Ekstrand | 198/781 |
| 4,241,825 | 12/1980 | Brouwer | 198/782 |
| 4,445,257 | 5/1984 | Delhaes | 29/117 |
| 4,448,302 | 5/1984 | Weaver et al. | 198/781 |
| 4,664,252 | 5/1987 | Galbraith | 198/722 |
| 4,815,588 | 3/1989 | Katsuragi et al. | 198/781 |
| 5,048,661 | 9/1991 | Toye | 193/37 X |
| 5,080,219 | 1/1992 | Imai et al. | 198/781 |
| 5,090,558 | 2/1992 | Hatouchi | 198/781 |
| 5,101,958 | 4/1992 | LeMay et al. | 198/436 |
| 5,129,507 | 7/1992 | Maeda et al. | 198/781 |
| 5,240,101 | 8/1993 | LeMay et al. | 198/443 |
| 5,316,129 | 5/1994 | Daily | 198/780 |
| 5,421,442 | 6/1995 | Agnoff | 198/37 |
| 5,645,155 | 7/1997 | Houghton | 193/35 R |

FOREIGN PATENT DOCUMENTS

| | | | |
|---|---|---|---|
| 1262160 | 2/1968 | Germany . | |
| 2032960 | 1/1972 | Germany . | |
| 2201802 | 5/1973 | Germany . | |
| 2359241 | 6/1975 | Germany . | |
| 0043060 | 4/1977 | Japan | 198/780 |
| 70347 | 12/1929 | Sweden . | |
| 706898 | 9/1952 | United Kingdom . | |
| 1241091 | 1/1970 | United Kingdom . | |
| 2095193 | 9/1982 | United Kingdom | 193/35 R |

*Primary Examiner*—James W. Keenan
*Attorney, Agent, or Firm*—Nilles & Nilles, S.C.

[57] ABSTRACT

The mounting for a roller shaft in the frame of a conveyor is designed to reduce the vibration of the shaft and the sound produced during conveyor operation. In several embodiments, the end of the shaft is provided with a taper, and a spring which is internal to the roller is used to bias the taper into the mounting hole. The resulting tight fit of the taper in the hole greatly reduces the vibration energy of the shaft. In another embodiment, a bushing separates the shaft and the hole and is designed to grip the shaft as it is pressed into place in the hole.

29 Claims, 3 Drawing Sheets

10
12
14
16
16
17
18
19
21
21
22
22
23
24
26
27

41
40
42
38
39
36
41
40

37
38
38
39
39
40

35
14
21

50
49
50
49
48
19
18
48
47
14
17
45
46
16
16
21

ROLLER SHAFT MOUNTING FOR SOUND AND MOTION CONTROL

This application is a divisional of U.S. patent application Ser. No. 08/375,931, which issued as U.S. Pat. No. 5,678, 676 on Oct. 21, 1997.

FIELD OF THE INVENTION

The invention relates to methods and apparatus for mounting roller shaft in the frame of a roller conveyor in order to reduce motion of the shaft and the sound which is produced thereby.

BACKGROUND OF THE INVENTION

A conveyor roller is mounted on a shaft which traditionally is hexagonal in cross-section. The simplest method of mounting a roller shaft to a conveyor frame is to form a mounting aperture such as a slot or a hexagonal hole in the frame which will receive the shaft. It is also traditional to position the hex shaft in the mounting aperture with the points of the shaft facing up and down, although it is known that in some constructions the points of the shaft face side-to-side.

The shaft is generally loose in the mounting aperture and vibration of the roller causes the shaft to bounce, causing noise and wear on both the shaft and the aperture. Over time, the wear from shaft vibration results in enlargement of the mounting aperture, creating an even looser fit between the shaft and the frame and generating even more noise. Eventually, the shaft vibration causes the frame to cut through the roller shaft, resulting in the roller dropping out of the frame.

It would accordingly be desirable to modify the mounting of a roller shaft in a conveyor frame to minimize the vibration of the shaft in the frame and thereby lessen the noise which is produced and the wear which occurs on both the shaft and the frame.

SUMMARY AND OBJECT OF THE INVENTION

According to the invention, the mounting of a roller shaft in a conveyor frame is modified to tighten the fit between the shaft and the frame. This is accomplished by either modifying the roller shaft or using an additional member which has the effect of restricting the relative motion between the shaft and the frame. In one embodiment, the portion of the shaft which mounts in the frame is tapered or a tapered cap is fitted onto the end of the shaft, so that in the final mounting position, the shaft fits tightly in the frame thus greatly reducing relative motion between the shaft and the frame. In other embodiments, an insert or washer is used to control the motion of the shaft in the frame and thus reduce any relative motion therebetween. In all of the embodiments, the reduced motion reduces the generation of noise and the amount of wear on both the roller shaft and the frame.

It is accordingly an object of the invention to provide an improved mounting for a roller shaft in the frame of a conveyor.

It is another object of the invention to provide a mounting for a roller shaft in a conveyor frame which reduces the vibration of the shaft during conveyor operation.

It is another object of the invention to provide a mounting for a roller shaft in a conveyor frame which reduces the vibration of the shaft in the frame and thus lessens the noise which is produced during conveyor operation.

It is still another object of the invention to provide a modified roller shaft which will fit tightly into the shaft mounting hole to reduce the vibration and noise which is produced during conveyor operation.

It is yet a further object of the invention to provide an insert which restricts the motion of a roller shaft in a conveyor frame to lessen the sound which is produced and the wear which occurs during conveyor operation.

These and other objects of the invention will become apparent from the following detailed description in which reference numerals used throughout the description correspond to numerals found on the drawing figures.

DESCRIPTION OF THE PREFERRED EMBODIMENT

Figure 1:
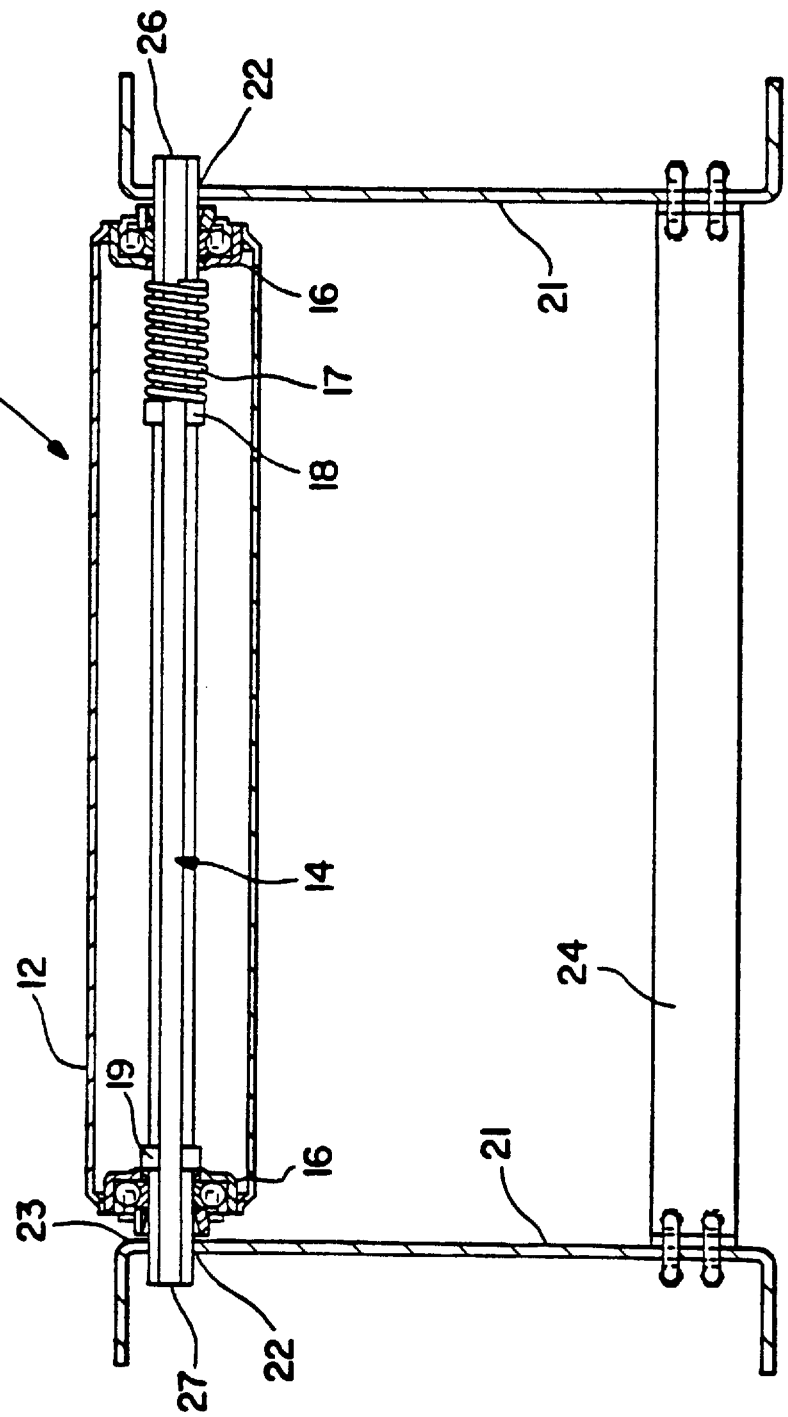
FIG. 1 is a sectional view showing a prior art conveyor roller mounted in a conveyor frame.

Referring now to FIG. 1, a conveyor roller mounted in a conveyor frame according to the prior art is generally designated by the reference numeral 10. The conveyor roller comprises an outer cylindrical shell 12 which is mounted on a hexagonal roller shaft 14 by means of bearings 16. The bearings 16 are press-fit into the ends of the roller shell 12 but are slip fit onto the hexagonal roller shaft 14. One end of the roller includes a compression spring 17 which is mounted between one of the bearings 16 and an interference nick 18 formed on the roller shaft. A second interference nick 19 on the other end of the roller shaft acts as a stop for the second bearing 16 and prevents the shaft from being removed from the roller. The shaft 14 is mounted in hex hole apertures 22 which are formed in the conveyor side frame members 21. The side frame members 21 are held in a spaced relationship by a spreader bar 24. In order to mount the roller shaft between the two frame members 21, the end 26 of the shaft 14 having the compression spring 17 is first placed into one of the apertures 22. The second end 27 of the shaft is then pressed against the bias of the spring 17 until the second end clears the inside edge 23 of the frame 21. The second end 27 is aligned with the left aperture 22 and then released whereby the bias of the spring 17 causes the second end 27 to extend through the second aperture 22. Those skilled in the art will recognize that once the roller is fully inserted in the frame members 21, the spring is no longer under compression and therefore exerts no force. If removal of the roller shaft from the conveyor frame is later required for repair or inspection purposes, the opposite procedure is used to first remove the second end 27 of the roller shaft from the frame member 21 by pushing the second end 27 against the bias of the spring 17. After the second end clears the inside edge 23 of the frame member, the first end 26 of the shaft may be removed from the other aperture 22 by displacing the conveyor roller toward the second end 27.

Figure 2:
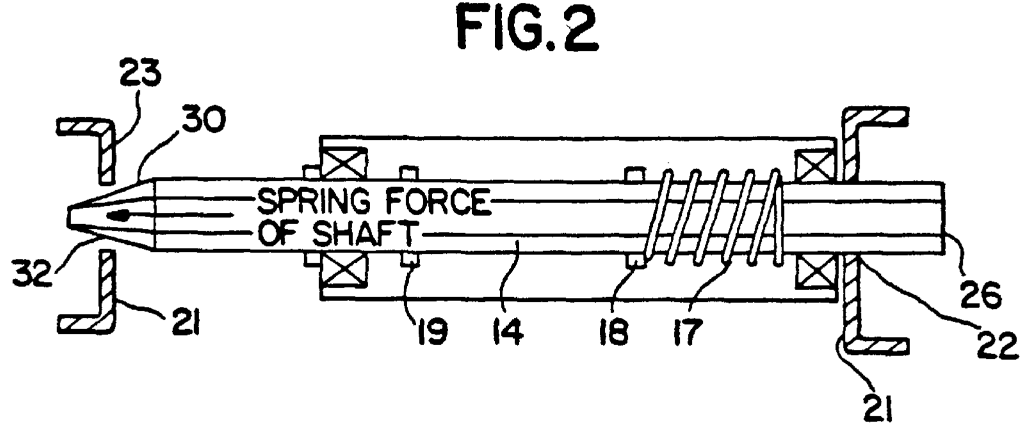
FIG. 2 shows a first embodiment of the invention in which one end of the roller shaft is tapered.

Turning now to FIG. 2, a first embodiment of the invention is shown in which the end of the roller shaft 14 which is opposite the biasing spring is formed with a taper 30. No portion of the taper 30 has a radial cross-sectional dimension which is greater than the radial crosssectional dimension of the shaft 14. The mounting hole 32 in the frame which receives the taper 30 is smaller than the cross section of the non-tapered portion of the shaft 14 so that the taper 30 will fit tightly in the hole 32. The end 26 of the shaft which is adjacent the biasing spring 17 is not tapered and mounts into a standard size hex hole 22.

The conveyor roller of FIG. 2 is mounted in the conveyor frame in the same manner as the prior art roller of FIG. 1. The end 26 of the roller shaft adjacent the spring 17 is placed in the mounting hole 22 in one side frame member 21 and the tapered end 30 is then pressed against the bias of the spring 17 until the end 30 clears the inside edge 23 of the other frame member 21. The tapered end 30 of the shaft is then aligned with the mounting hole 32 on the conveyor frame 21 and released to allow the spring 17 to force the taper into the mounting hole 32. The spring 17 remains under compression and presses the tapered end 30 snugly into the hole 32 when the roller is in its final position between the side members 21. This snug fit greatly reduces vibration and motion of the shaft 14 in both holes 22 and 32. Using this embodiment, the vibration energy is reduced by a factor of 1000, and results in the generation of less noise and less wear.

Figure 3:
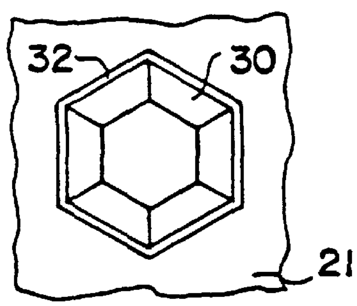
FIG. 3 shows a tapered shaft end mounted in a six sided hole.
Figure 4:
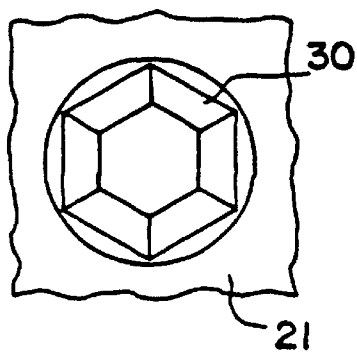
FIG. 4 shows a tapered shaft end mounted in a round hole.

It should be noted that both the tapered end of the shaft 14 and the mounting hole which receives it may have any number of shapes. FIG. 3 shows a hexagonal tapered end 30 in a hexagonal hole 32. FIG. 4 shows a hexagonal tapered end 30 in a round hole 33. Those skilled in the art will recognize that other complimentary or interfering shape patterns may be used for the tapered shaft end and mounting hole.

Figure 5:
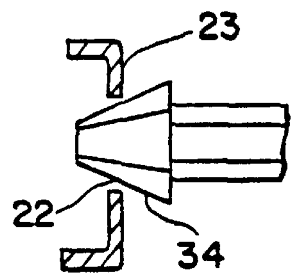
FIG. 5 shows a second embodiment of the invention utilizing a roller shaft having a tapered end.

FIG. 5 shows another embodiment of the invention in which an enlarged tapered end 34 is formed on the shaft 14 by a cold forming operation. The enlarged tapered end 34 is preferably hexagonal in cross section and has a portion with a radial cross-sectional dimension which is greater than the radial cross-sectional dimension of the shaft 14. Using this method, the aperture 22 which is formed in the conveyor side member 21 may be standard size but still snugly engaged by the tapered end 34 of the shaft since the shaft end is enlarged from its normal size. As in the previous embodiment, the mounting hole 22 and the enlarged tapered end 34 may be complimentary shapes such as hexagonal or interfering shape combinations.

Figure 6:
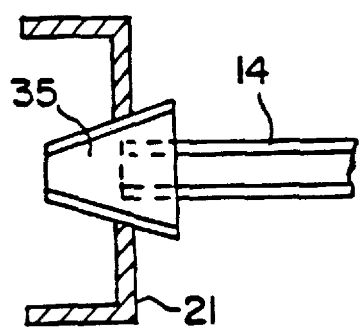
FIG. 6 shows another embodiment of the invention in which a plastic cone is placed on the end of the roller shaft.

FIG. 6 shows a variation of the embodiment of FIG. 3 in which a plastic cone 35 is fit onto the end of the roller shaft 14. The plastic cone may be hexagonal in cross section to mate with a standard hex hole 22. The plastic cone 35 which has a portion with a radial cross-sectional dimension which is greater than the radial cross-sectional dimension of the roller shaft 14 allows a standard size roller shaft to be used with a standard size hex hole 22 while obtaining a tight fit between the tapered surface of the cone and the sides of the hole. The outer surface of the cone 35 and the mounting hole 22 may be the same shape, such as hexagonal, or may have any number of interfering shape combinations, such as hexagonal and round, or other combination as desired.

Figure 7:
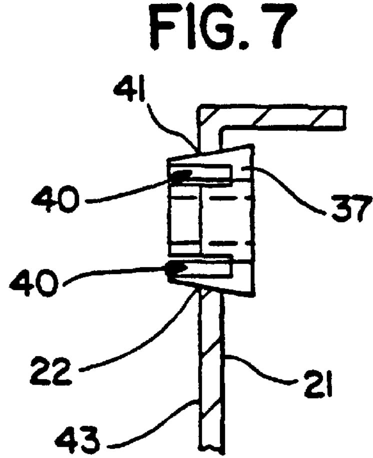
FIG. 7 shows another embodiment of the invention in which a plastic bushing is used to mount the roller shaft in the conveyor frame.
Figure 8:
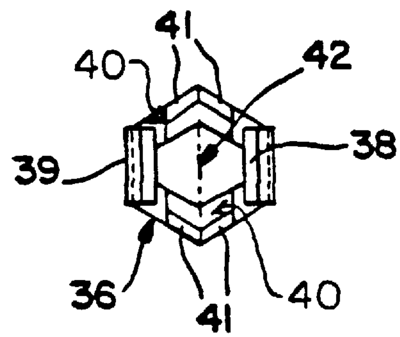
FIGS. 8 and 9 are end and top views respectively of the bushing of FIG. 7.
Figure 9:
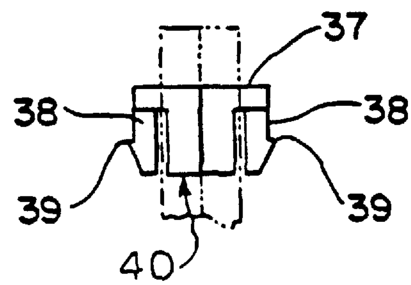

Turning now to FIGS. 7–9, another embodiment of the invention is shown in which a plastic bushing 36 is used to mount a roller shaft in a conveyor frame. The bushing 36 comprises a body 37 with two latching legs 38 and two tapered legs 40 which are attached thereto. The body 37 and the inner surface of the legs 38 and 40 form a six-sided bore 42 which will receive a hexagonal roller shaft. The latching legs 38 are formed with a latch 39 which engages the side of the frame member 21 to prevent withdrawal of the bushing once it has been pressed into a mounting hole 22. The tapered legs 40 are formed with a taper 41 on the outer surface thereof which causes the tapered legs 40 to squeeze together and reduce the size of the bore 42 as the bushing is pressed into the mounting hole. As shown in FIG. 8, each tapered leg 40 is “V” shaped to engage two sides of the mounting hole 22.

In order to use the bushing, a roller shaft 14 is first mounted between two frame members 21 in the conventional way. The bushing is then slipped over the end of the shaft 14 which extends through the frame member and pressed into the hex hole 22. The tapered outer surface 41 of the tapered legs 40 cause them to squeeze together and grip the roller shaft as the bushing is pressed to its final position. Once the latches 39 on the latching legs 38 are pressed through the hole, the latches 39 catch on the inner side 43 of the frame member to hold the bushing in place.

The gripping action of the tapered legs 40 on the roller shaft greatly reduces vibration of the shaft and any noise which may be produced thereby. It has been seen that this embodiment reduces vibration energy by a factor of 100. The bushing 36 itself eliminates the metal on metal contact between the shaft 14 and the mounting hole 22. The bushing 36 may be formed of conductive nylon or other material which exhibits the required wear characteristics and allows the static charge which builds up on the rollers to be bled off to ground. In the preferred embodiment, two bushings 36, one on each end of the roller shaft, are used to mount each roller to the frame members.

Figure 10:
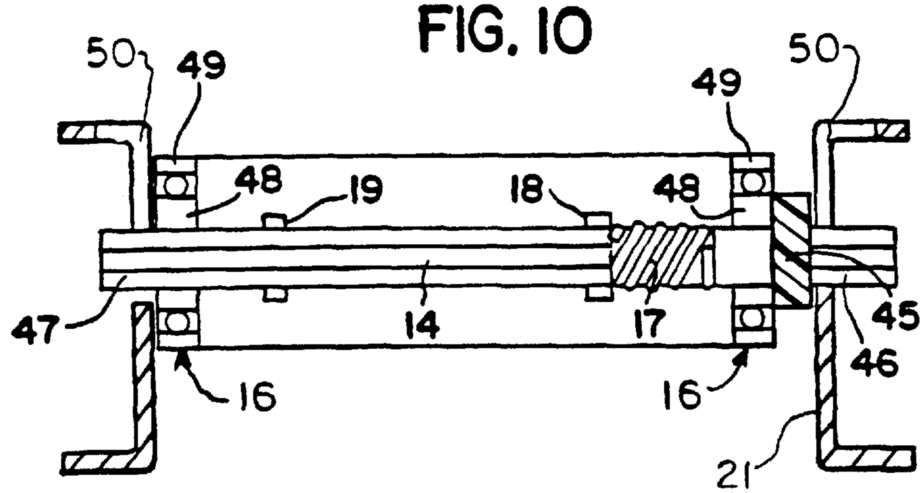
FIG. 10 shows a further embodiment of the invention in which a resilient washer is used between one end of the conveyor roller and the conveyor frame.

FIG. 10 shows another embodiment of the invention in which a bias is created between the roller bearings 16 and the frame members 21 by putting a compliant washer 45 on one end 46 of the roller shaft 14. The compliant washer 45, which may be urethane or other suitable material, is compressed as the roller is mounted between the frame members 21. Once the roller has been mounted, the opposite end 47 of the roller is pressed against the frame by the washer 45. The bias caused by the compliant washer 45 reduces vibration of the roller shaft 14 in the hex holes 22. It has been seen that this embodiment reduces vibration energy by a factor of 100.The bearings are dimensioned so that only the inner race 48 of each bearing presses against the compliant washer 45, or the opposite side frame member 21, as the case may be. As a result, the compliant washer does not restrict the rotation of the roller shell 12 which is supported on the outer race 49 of each bearing. This works equally well whether the side members 21 are provided with hex holes 22 or slots 50, as shown, to receive the roller shaft 14.

Having thus described the invention, various alterations and modifications will occur to those skilled in the art, which alterations and modifications are intended to be within the scope of the invention as defined by the appended claims.

What is claimed is:

1. A method for mounting a roller shaft in a frame in order to reduce the motion of the shaft and the sound which is produced thereby comprising:

forming a taper on one end of the shaft;

mounting the taper in a hole which is formed in the frame; and biasing the shaft to force the taper tightly into the hole, forming the taper so that a portion of the taper has a radial cross-sectional dimension which is greater than the cross-sectional dimension of the shaft, said taper decreasing at least generally continuously in diameter from inner to outer ends thereof.

2. The method of claim 1 further comprising:

forming the taper by mounting a cone on the end of the shaft.

3. The method of claim 1 further comprising:

forming the taper by mounting a plastic cone on the end of the shaft.

4. The method of claim 3 further comprising:

biasing the shaft with a spring which is internal to the roller to force the cone into the hole.

5. A method for mounting a roller shaft in a frame in order to reduce the motion of the shaft and the sound which is produced thereby comprising:

forming a taper on the one end of the shaft;

mounting the taper in a hole which is formed in the frame; and biasing the shaft to force the taper tightly into the hole;

forming the taper so that a portion of the taper has a radial cross-sectional dimension which is greater than the cross-sectional dimension of the shaft; and mounting the taper in a hole which has a radial cross-sectional dimension which is no smaller than the radial cross-sectional dimension of the shaft.

6. The method of claim 5 further comprising:

biasing the shaft with a spring which is internal to the roller to force the taper into the hole.

7. A mounting for a conveyor roller in a frame in which the roller comprises an outer cylindrical shell, an elongated shaft and an internal roller spring on the shaft, the mounting comprising:

opposed holes in the frame for receiving opposite ends of the shaft;

a taper on one end of the shaft for engaging one of the holes, wherein the taper 1) decrease at least generally continuously in diameter from inner to outer ends thereof and 2) is formed so that a portion of the taper has a radial crosssectional dimension which is greater than the cross-sectional dimension of the shaft, whereby the roller spring biases the taper into the one hole to decrease the motion of the shaft in the hole.

8. The mounting of claim 7 further comprising:

six sides on the taper and a hexagonal hole, whereby the taper and the hole have complimentary shapes.

9. The mounting of claim 7 further comprising:

six sides on the taper and a round hole, whereby the taper and the hole have interfering shapes.

10. The mounting of claim 7 further comprising:

a cone comprising the taper attached to the end of the shaft, whereby the taper of the cone fits into the hole.

11. The mounting of claim 10 wherein the cone comprises a plastic material.

12. A mounting for a conveyor roller in a frame in which the roller comprises an outer cylindrical shell, an elongated shaft and an internal roller spring on the shaft, the mounting comprising:

opposed holes in the frame for receiving opposite ends of the shaft;

a taper on one end of the shaft for engaging one of the holes, whereby the roller spring biases the taper into one hole to decrease the motion of the shaft in the hole, an enlarged end on the end of the shaft, wherein the taper is formed on the enlarged end, whereby the taper of the enlarged end fits tightly into a hole which has the same radial cross-section as the radial cross-section of the shaft.

13. A conveyor assembly comprising:

a frame having first and second opposed holes formed therein;

a roller assembly including an elongated shaft having first and second opposite ends, said second end being mounted in said second hole and said first end having a taper formed so that a portion of the taper has a radial cross-sectional dimension which is greater than the cross-sectional dimension of the shaft, said taper decreasing at least generally continuously in diameter from inner to outer ends thereof, a cylindrical roller rotatably mounted on said shaft between said first and second ends thereof, and a spring which biases said taper into mating engagement with a peripheral surface of said first hole.

14. The conveyor assembly of claim 13, wherein said taper and said first hole have complimentary, non-circular shapes.

15. The conveyor assembly of claim 13, wherein said taper comprises a tapered element which is attached to said first end of said shaft.

16. The conveyor assembly of claim 15, wherein said tapered element is formed of a plastic material.

17. A conveyor assembly comprising:

a frame having first and second opposite holes formed therein;

a roller assembly including an elongated shaft having first and second opposite ends, said second end being mounted in said second hole and said first end having a taper, a cylindrical roller rotatably mounted on said shaft between said first and second ends thereof, and a spring which biases said taper into mating engagement with a peripheral surface of said first hole, wherein said first end of said shaft is enlarged relative to a central portion of said shaft, wherein said first hole has a diameter which is equal to the diameter of said central portion of said shaft, and wherein said taper fits tightly into said first hole.

18. A conveyor assembly comprising:

a frame having first and second opposed holes formed therein; and a roller assembly including an elongated shaft having first and second opposite ends, said second end being mounted in said second hole, a cap mounted on said first end of said shaft, said cap being tapered along at least a portion of an axial length thereof, wherein said cap is formed so that a portion of the tapered portion of said cap has a radial cross-sectional dimension which is no smaller than the radial cross-sectional dimension of the shaft, the tapered portion of said cap decreasing at least generally continuously in diameter from inner to outer ends thereof, a cylindrical roller supported on said shaft between said first and second ends thereof, and a spring which biases said cap into a position in which said portion of said cap is in mating engagement with a peripheral surface of said first hole.

19. The conveyor assembly of claim 18, wherein said portion of said cap and said first hole have complimentary, non-circular shapes.

20. The conveyor assembly of claim 18, wherein said cap is formed of a plastic material.

21. The conveyor as defined in claim 18, wherein said spring does not abut said cap.

22. The conveyor as defined in claim 18, further comprising at least one bearing which rotatably supports said cylindrical roller assembly on said shaft.

23. The conveyor as defined in claim 18, wherein said bearing rotatably supports said cylindrical roller directly on said shaft.

24. A conveyor assembly comprising:

a frame having first and second opposed holes formed therein; and a roller assembly including an elongated shaft having first and second opposite ends, said second end being mounted in said second hole, a cap mounted on said first end of said shaft, said cap being tapered along at least a portion of an axial length thereof, a cylindrical roller supported on said shaft between said first and second ends thereof, and a spring which biases said cap into a position in which said portion of said cap is in mating engagement with a peripheral surface of said first hole, wherein said spring surrounds an outer peripheral surface of said shaft.

25. The conveyor assembly as defined in claim 24, wherein said spring is positioned within said cylindrical roller.

26. A conveyor assembly comprising:

a frame having first and second opposed holes formed therein; and a roller assembly including an elongated shaft having first and second opposite ends, said second end being mounted in said second hole, a cap mounted on said first end of said shaft, said cap being formed of a plastic material and being tapered along at least a portion of an axial length thereof, wherein at least said portion of said cap has a non-circular shape, a cylindrical roller rotatably supported on said shaft between said first and second ends thereof via first and second bearings, and a spring which surrounds said shaft and which biases said cap into a position in which said portion of said cap is in mating engagement with a peripheral surface of said first hole.

27. The conveyor as defined in claim 26, wherein said spring does not abut said cap.

28. The conveyor as defined in claim 26, wherein said first and second bearings both support said cylindrical roller directly on said shaft.

29. The conveyor assembly as defined in claim 26, wherein said spring is positioned within said cylindrical roller.

* * * * *